(12) United States Patent
Persson

(10) Patent No.: US 9,579,753 B2
(45) Date of Patent: Feb. 28, 2017

(54) SUPPORTING APPLIANCE AND BACKING ARRANGEMENT FOR USE IN FRICTION STIR WELDING

(75) Inventor: Christer Persson, Finnerödja (SE)

(73) Assignee: ESAB AB, Gothenburg (SE)

( * ) Notice: Subject to any disclaimer, the term of this patent is extended or adjusted under 35 U.S.C. 154(b) by 184 days.

(21) Appl. No.: 14/375,603

(22) PCT Filed: Feb. 9, 2012

(86) PCT No.: PCT/SE2012/050128
§ 371 (c)(1),
(2), (4) Date: Dec. 5, 2014

(87) PCT Pub. No.: WO2013/119155
PCT Pub. Date: Aug. 15, 2013

(65) Prior Publication Data
US 2015/0097021 A1    Apr. 9, 2015

(51) Int. Cl.
*B23K 20/12*    (2006.01)
*B23K 37/047*    (2006.01)
(Continued)

(52) U.S. Cl.
CPC ............ *B23K 37/047* (2013.01); *B23K 20/12* (2013.01); *B23K 20/126* (2013.01); *B65G 15/00* (2013.01);
(Continued)

(58) Field of Classification Search
CPC ........ B65G 23/06; B65G 23/04; B65G 15/30; B65G 23/22; B65G 15/00; B65G 17/086
(Continued)

(56) References Cited

U.S. PATENT DOCUMENTS 3,934,712 A * 1/1976 Jende .................. B65G 17/067
                                                                 198/834
4,092,928 A    6/1978 Clavin
(Continued)

FOREIGN PATENT DOCUMENTS

EP    1736271 A1    12/2006
EP    1864747 A1    12/2007
(Continued)

OTHER PUBLICATIONS

PCT International Search Report for PCT/SE2012/050128; completed Sep. 26, 2012.

*Primary Examiner* — Erin Saad

(57) ABSTRACT

Support device (20) meant to bear in supporting fashion on one or more work pieces in connection with friction stir welding, comprising:
A holder unit (30),
a first support wheel (40) which can be rotated relative to the holder unit about a first rotational axis (R1), and
a second support wheel (50) which can be rotated relative to the holder unit around a second rotational axis (R2) which is parallel to the said first rotational axis,
a support body (60) connected with the holder unit which is situated between support wheels and exhibits a support surface (61) turned outward, and
an endless flexible metal belt (21), which runs in a loop over the outer peripheral surfaces (41, 51) of the support wheels, and is in sliding contact with the support surface of the support device, wherein the support devices are shaped to provide support as they bear on one or more work pieces with the outer peripheral surfaces of the support wheel, and with the support surface of the support body resting against the work pieces via the metal belt.

(Continued)

The invention also provides a backing arrangement comprising such a support device.

14 Claims, 4 Drawing Sheets

(51) Int. Cl.

| | | |
|---|---|---|
| *B65G 23/06* | (2006.01) | |
| *B65G 23/22* | (2006.01) | |
| *B65G 23/04* | (2006.01) | |
| *B65G 15/00* | (2006.01) | |
| *B65G 15/30* | (2006.01) | |

(52) U.S. Cl.
CPC ............ *B65G 15/30* (2013.01); *B65G 23/04* (2013.01); *B65G 23/06* (2013.01); *B65G 23/22* (2013.01)

(58) Field of Classification Search
USPC .... 271/3.14, 198; 198/510.1, 804, 834, 835; 228/112.1, 113, 114, 2.1
See application file for complete search history.

(56) References Cited

U.S. PATENT DOCUMENTS

| | | | |
|---|---|---|---|
| 6,364,197 | B1 | 4/2002 | Oelgoetz et al. |
| 8,033,443 | B1 | 10/2011 | Sigler et al. |
| 2001/0015369 | A1 | 8/2001 | Litwinski et al. |
| 2001/0015370 | A1 | 8/2001 | Matsunaga et al. |

FOREIGN PATENT DOCUMENTS

| | | |
|---|---|---|
| JP | 56160691 A | 11/1981 |
| JP | H05-318184 A | 12/1993 |
| JP | H08-155680 A | 6/1996 |
| JP | 2001-232484 A | 8/2001 |
| JP | 2002-103061 A | 4/2002 |
| JP | 2004-122211 A | 4/2004 |

\* cited by examiner

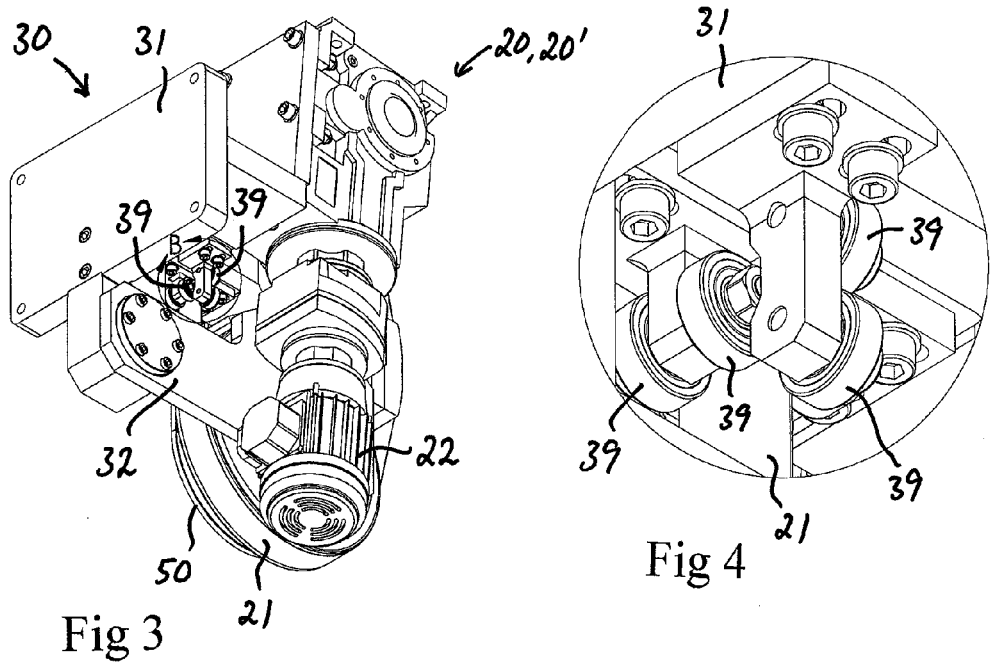
Fig 3
Fig 4
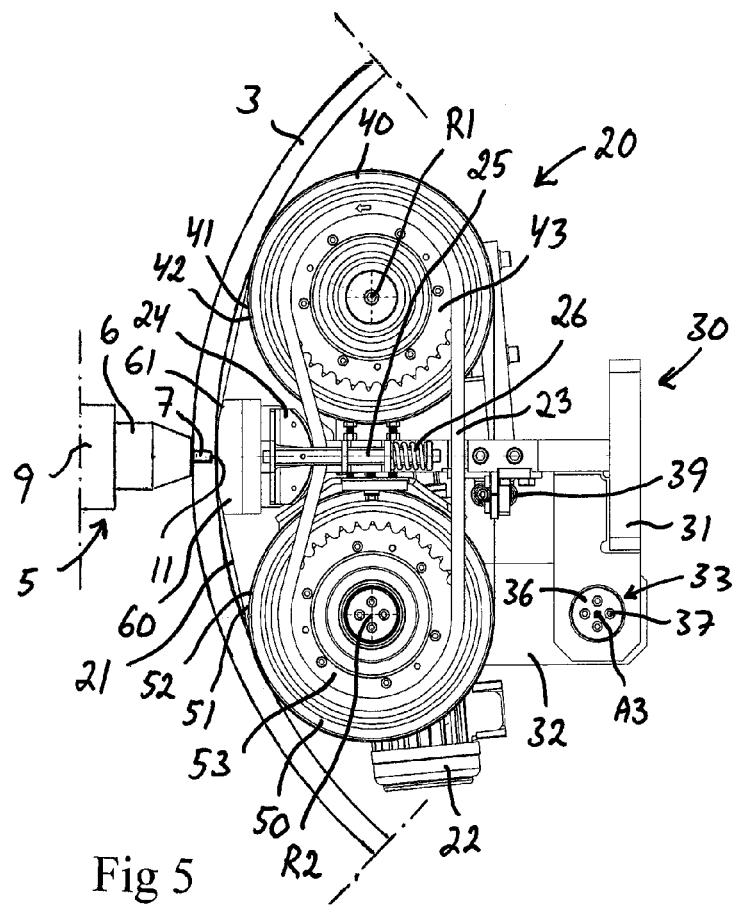
Fig 5

SUPPORTING APPLIANCE AND BACKING ARRANGEMENT FOR USE IN FRICTION STIR WELDING

CROSS-REFERENCE TO RELATED APPLICATION

This is a national stage application of pending PCT Application No. PCT/SE2012/050128 filed 9 Feb. 2012, by Christer Persson, titled "Supporting Appliance and Backing Arrangement for Use in Friction Stir Welding", which is incorporated herein by reference in its entirety.

FIELD OF THE INVENTION AND PRIOR ART

The present invention provides a support device provided to bear in supporting fashion on one or more work pieces in connection with friction stir welding, and a backing arrangement to support a welded seam that is formed between two work pieces by friction stir welding. The invention also provides a method for fitting together two work pieces extending along a seam between the work pieces via friction stir welding.

Friction stir welding is a well-known and proven welding method which, among other things, can be used to fit together work pieces and for repair of cracks in a work piece. Two work pieces that are fitted to each other with the aid of friction stir welding are plasticized along their joining line by frictional heating from a rotating welding tool that traverses the seam between the work pieces simultaneous with being pressed against the work pieces, which, during the welding operation, are to be fixed relative to each other. The welding tool comprises a rotating body which, during the welding operation, is pressed against the work pieces and a pin that extends out from the body which is guided forward while rotating in the seam between the work pieces in pressing action with the work pieces. As is described in WO 93/10935 A1 and WO 95/26254 A1, the welding tool is to be manufactured of a material harder than the work pieces. The welding tool can be made to traverse the seam between the work pieces by moving the welding tool along, with the work pieces placed stationary, or by moving the work pieces relative to a welding tool placed in stationary fashion.

With friction stir welding, the welding tool must be pressed with great force against the work pieces to make it possible to frictionally heat them enough to cause the desired plasticizing of the work pieces in the seam between them. If a welding tool is used that has a fixed or retractable pin, a backing must be applied against the back side of the work pieces opposite the welding tool to admit at least a portion of the compression force that is exerted by the welding tool against the work pieces and, to keep the material plasticized during the welding operation in the area of the welded seam. During welding of flat work pieces, for example, it is usually simple to arrange for a backing against the rear side of the work pieces, for example by letting the work pieces rest against a planar backing in the form of an elongated beam or work table. When friction stir welding is used, for example, to join hollow cylindrical work pieces, along a seam that extends in the circumferential direction of the work pieces, it becomes more problematical, however, to create the requisite backing, especially if the work pieces are to be joined to form a container with a relatively small access opening, such as for example a fuel tank for a spacecraft or aircraft. In the latter case it is for example possible to use a removable, annular backing that is tensioned against the work pieces inside them, as is described for example in U.S. Pat. No. 6,247,634 B1. However, one drawback of such a backing is that it must be specially adapted to the dimensions of the work pieces that are to be joined, and installation and removal of the backing within the work pieces may be difficult and time-consuming. In U.S. Pat. No. 6,070,784 A, a description is given of an alternative solution, where a rotatable backing roller, carried by a support arm, is applied to the work pieces within them. One drawback of the latter solution is that the support rollers manifest a limited, linear contact surface against the work pieces, which makes heavy demands for a correct positioning of the backing rollers relative to the welding tool applied to the outside of the work pieces, so that a good quality weld can be created.

With friction stir welding it is also important to use a welding tool in the form of a so-called Bobbin tool, which is a welding tool where a backing piece is fixed to the welding tool pin. In this case the backing device together with the welding tool traverses the seam between the work pieces that are to be joined. This solution, which is described for example in U.S. Pat. No. 6,237,835 B1, can be used, among other things, to join hollow cylindrical work pieces along a seam that extends in the circumferential direction of the work pieces. One drawback with this solution, however, is that it requires relatively extensive preparations to set the welding tool up for welding, including preliminary drilling of a hole in the work pieces for the welding tool pin from the inside of the work pieces. After the welding operation has been completed, in addition a hole remains in the work pieces. Another drawback is that this type of friction stir welding is a relatively sensitive welding process and requires the use of a relatively expensive welding tool.

GOAL OF THE INVENTION

The goal of the present invention is to produce a new and advantageous support device which is provided to press in supporting fashion on one or more work pieces in connection with friction stir welding, and which among other things, is suitable to use to support a welded seam formed between two work pieces by friction stir welding.

SUMMARY OF THE INVENTION

According to the invention, the said goal is reached with the aid of a support device of the patent disclosure.

The invention-specific support device comprises:

A holder unit a first support wheel carried by the holder unit, which exhibits an outer peripheral surface and which can be rotated relative to the holder unit about a first rotational axis, a second support wheel carried by the holder unit, which exhibits an outer peripheral surface and which can be rotated relative to the holder unit around a second rotational axis which is parallel to the said first rotational axis, a support device connected with the holder unit, which is situated between the support wheels and which exhibits a support surface facing outwards, and an endless flexible metallic belt which runs in a loop over the outer peripheral surfaces of the support wheel, and presses in sliding fashion on the outer surface of the support device, wherein the support device is shaped so as to press in supporting fashion on one or more work pieces with the outer peripheral surfaces of the support wheel, and the support surface of the support device resting against the work piece via the metal belt By means of the two support wheels and the support device, three support points placed at intervals from each other are furnished between the invention-specific support device and work pieces, which provides a good load distribution. By adapting the shape of the support surface of the support device to the shape of the work pieces, in addition a relatively large compression-admitting contact surface is obtained between the support device and work pieces. If there is a mutual shifting between the support device and the work pieces, gliding between the metal belt and the work pieces can be avoided by allowing the metal belt to advance by rolling over the work pieces, depending on how the support device shifts relative to the work pieces. By this means, the support device can traverse the work pieces in supporting contact with their surface, without damaging the work pieces.

When the support device is used to support a welded seam that is formed between two work pieces by friction stir welding, the support device functions, as does the metal belt bearing on the outer surface of the support device as a backing to admit at least a portion of the compressive force exerted by the body of the welding tool against the work pieces, and to keep the material plasticized during the welding operation in the area of the welded seam formed by the welding tool. In this case the support device is provided to be maintained to bear on the work pieces with the support surface of the support device positioned opposite the welding tool on the opposite side of the work pieces. If the shape of the support surface of the support device is adapted to the shape of the work pieces, that part of the metal belt that runs over the support surface of the support device to furnish a relatively large, active backing surface for the welding tool, and this active backing surface can traverse the seam between the work pieces without sliding against the work pieces. The support wheels situated on both sides of this backing surface contribute to the support of the work pieces, so that the risk that the work pieces will buckle during the welding operation is reduced. In this case the support device is kept positioned opposite the welding tool during the welding operation. If the work pieces move relative to a stationary welding tool during the welding operation, then the support device will also remain in a stationary position, and if the welding tool moves relative to stationary work pieces, then the support device will move synchronously with the welding tool. By adaptation of the radii of the support surfaces of the support device to the inner radii of the two hollow, cylindrical work pieces which are to be joined by friction stir welding, a support device is obtained that is well suited to provide support on the interior of the work pieces to a welded seam that extends on a circular path which forms between these work pieces.

According to one embodiment form of the invention, the support device comprises a drive mechanism which is placed to cause the first support wheel to rotate. By this means, movements of the support device are facilitated relative to the work pieces which the support adjoins.

Another embodiment of the invention is characterized by:
a first toothed which that is connected in rotationally stable fashion with the first support wheel,
a second toothed wheel that is connected in rotationally rigid fashion with the second toothed wheel, and
that the second support wheel is connected so it can be driven with the first support wheel via an endless, flexible transmission device in the form of a drive chain or a drive belt which runs in a loop over the said first and second toothed wheels.

With the aid of the transmission device and toothed wheels, the first and second support wheels can be rotated by one and the same drive mechanism.

According to another embodiment form of the invention, the support device comprises a spring-loaded tensioning device which is situated so as to act upon the said transmission device to keep it tensioned.

Another embodiment form of the invention is characterized in that:
the holder unit comprises a base part and a holder element connected in pivoting fashion with the base part, wherein the holder element is adjustable in various rotary positions relative to the base part by rotation of the holder element relative to the base part about a rotational axis which is parallel to the said first and second rotational axes.
That one of the support wheels is supported so as to rotate at the holder element, and
That the support device exhibits a locking device for secure locking of the holder element on the base part in the desired rotary position relative to it.

By rotating the holder element relative to the base part, it becomes possible to govern the position of the support wheel which is positioned so as to rotate at the holder element and the support device can thus be adapted to bear on work pieces having different radii.

According to another embodiment form of the invention, the support device can be adjusted in various positions relative to the base part of the holder unit, to thus permit regulation of the position of the support device relative to the support wheels. By this means another possibility is offered to adjust the support device, depending on the current shape of the support pieces.

According to another embodiment form of the invention, the support device is detachably connected with the holder unit. By this means, if necessary a damaged support device can be replaced by a new support device. By changing out support devices with support surfaces of varying shapes, in addition it becomes possible to adapt the support device depending on the current shapes of working pieces.

According to another embodiment form of the invention, the support wheels have a friction-enhancing coating, preferably of rubber material, on their outer peripheral surface, with the metal belt being placed to bear on this coating. By this means there is a better adhesion between the metal belt and support wheels, by which the risk of skidding and the wear associated with it, between the metal belt and support wheel, is reduced.

Other advantageous features of the support device according to the invention are derived from the dependent patent claims and the specification that follows below.

The invention also provides a backing arrangement to support a welded seam that is formed between two work pieces by friction stir welding with a welding tool, as well as a method for joining two work pieces along a seam extending between the work pieces by friction stir welding.

BRIEF DESCRIPTION OF THE DRAWINGS

The invention shall be described in greater detail in what follows with the aid of an embodiment example with reference to the appended drawings. Shown are:

FIG. 3 A perspective view from another side of the support device according to FIG. 2

FIG. 4 a detailed enlargement according to the circle B in FIG. 3

FIG. 5 a side view of the support device according to FIG. 2

DETAILED DESCRIPTION OF EMBODIMENT FORMS OF THE INVENTION

Figure 1:
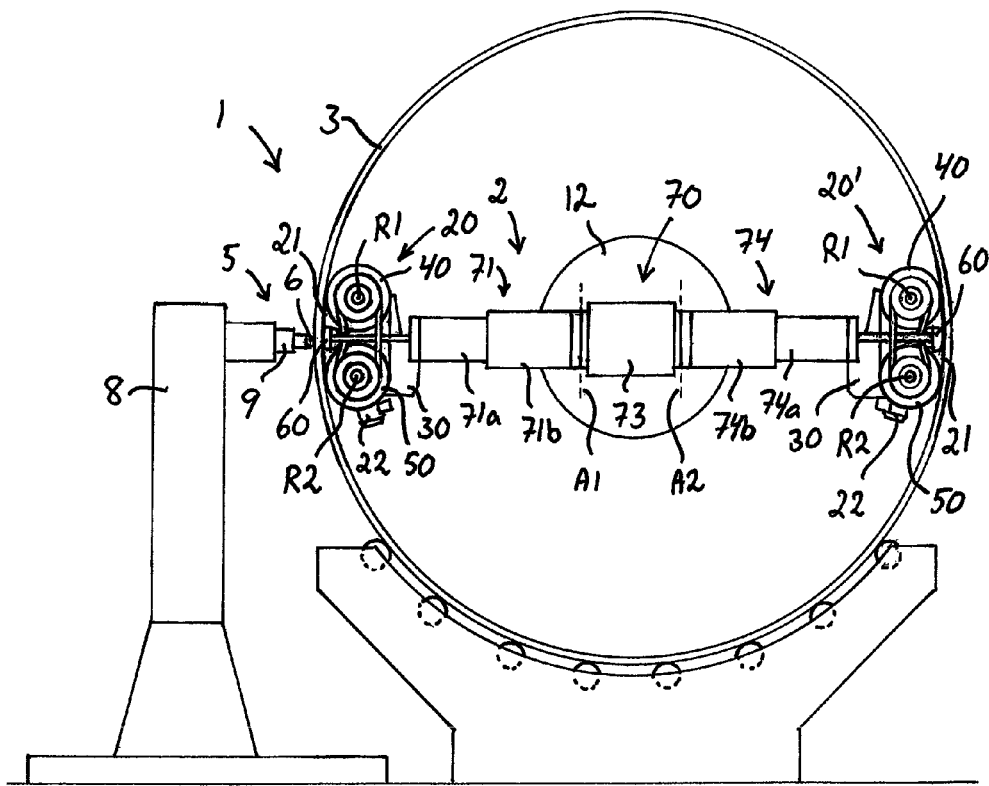
FIG. 1: A schematic illustration of a welding station for friction stir welding, comprising two support devices according to the present invention FIG. 2 A perspective view of a support device according to one embodiment form of the present invention with a support device shaped to bear on curved work pieces.

FIG. 1 depicts a welding station 1 for friction stir welding, comprising a welding tool 5 and a backing arrangement 2. The depicted welding station 1 is shaped to join work pieces 3, 4 (also see FIGS. 9-11) with a circular cross-sectional shape for formation of fuel tanks, for example, for spacecraft or aircraft. The welding tool 5 is a welding tool for friction stir welding of conventional shaping with a rotatable body 6 and pin 7 extending from the body (see FIG. 5). In the depicted example, the pin 7 is fixed to the body 6 to rotate together with it. The body 6 is connected in rotationally rigid fashion with a spindle 9 supported so as to rotate in a machine base 8. This spindle 9 rotates with the aid of a drive unit (not shown) situated in the machine base 8, for example in the form of an electric or hydraulic motor. The two work pieces 3, 4 that are to be joined are kept fixed relative to each other during the welding operation with the aid of fixed tensioning tools which are (not shown).

During the welding operation, the welding tool 5 traverses a seam 10 which extends between work pieces 3, 4 on a curved path while the body 6, rotating at high speed, bears on the outer side of the work pieces 3, 4 while simultaneously the pin 7 is advanced while rotating in the seam 10 in a compressing action against the work pieces. Owing to the rotation of the body 6 against the outside of the work pieces 3, 4, frictional heat is generated which causes the end edges of the work pieces to plasticize in the area closest to pin 7. In the depicted example, seam 10 extends in the area of the circumferential direction of the work pieces, with the seam consequently extending in a circular path, since the depicted work pieces 3, 4 exhibit a circular cross-sectional form.

In the depicted example, the backing arrangement 2 comprises two support devices 20, 20', according to an embodiment form of the present invention. A first of these support devices 20 is used as a backing for the welding tool 5 and is provided to bear on the work pieces 3, 4 opposite the rotating body 6 and pin 7 of the welding tool to admit at least a part of the compression force which is exerted via the body 6 by the welding tool 5 against work pieces 3, 4 and to keep the material plasticized during the welding operation in the area of the welded seam. The other support device 20' is utilized as a support device in the backing arrangement 2.

The respective support devices 20, 20' exhibit:
A holder unit 30,
A first support wheel 40 carried by the holder unit 30, which exhibits an outer peripheral surface 41 and which can rotate relative to holder unit 30 about a first rotational axis R1 (see FIGS. 1 and 5), and
A second support wheel 50 carried by holder unit 30, which exhibits an outer peripheral surface 51 and which can rotate relative to the holder unit 30 about a second rotational axis R2 which is parallel to said first rotational axis R1.
A support body 60 connected with holder unit 30, which is situated between support wheels 40, 50, and exhibits a support surface 61 turned outward, and
An endless flexible metal belt 21, which runs in a loop over the outer peripheral surfaces 41, 51 of the support wheels, and is in sliding contact with the support surface 61 of the support device.

The support devices 20, 20' are shaped to provide support as they bear on work pieces 3, 4 with the outer peripheral surfaces 41, 51 of the support wheel, and with the support surface 61 of the support device resting against the work pieces via the metal belt 21.

Advantageously the support body 60 is detachably connected to the holder unit 30, if necessary to permit a changeout of the support device with a new support device with the same shape or for a support device with a support surface 61 having a different form.

The respective support wheels 40, 50 are advantageously supplied with a friction-enhancing coating 42, 52, for example made of rubber material, on their outer peripheral surface 41, 51, wherein the metal belt 21 is situated so as to bear on this coating 42, 52.

With the depicted embodiment form, the support devices 20, 20' comprise a drive mechanism 22 which is situated so as to make the first support wheel 40 rotate. This drive mechanism 22 is carried by the holder unit 30, and can, for example, be an electric or hydraulic motor.

Figure 2:
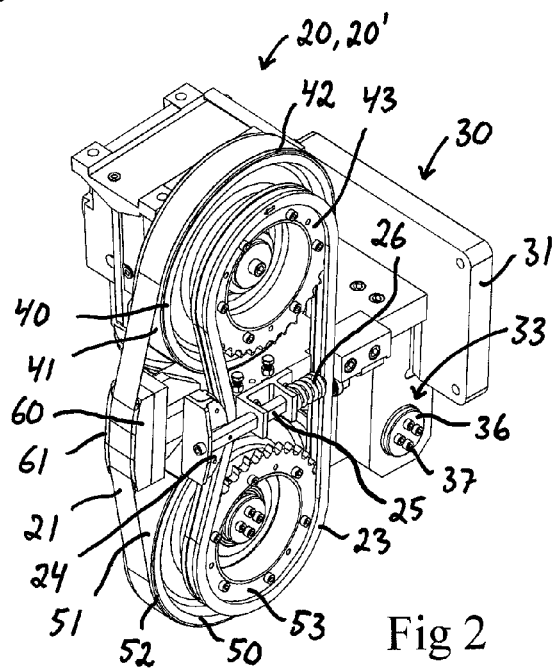
Figure 6:
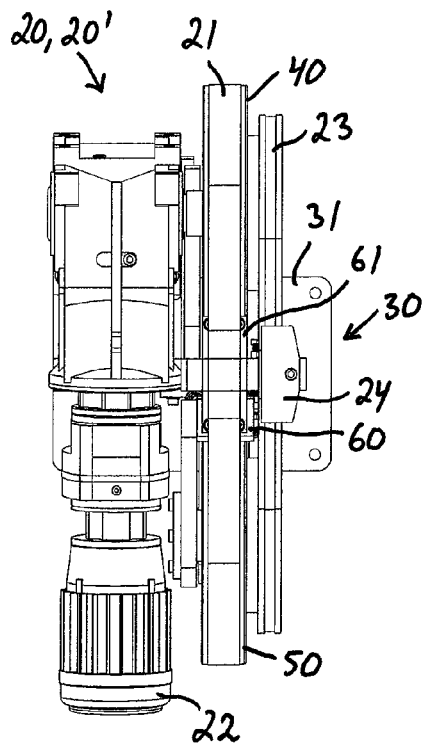
FIG. 6 a horizontal view of the support device as per FIG. 2

With the depicted embodiment form, a first toothed wheel 43 (see FIGS. 2 and 5) is connected in rotationally rigid fashion with the first support wheel 40, while a second toothed wheel 53 is connected in rotationally rigid fashion with second support wheel 50. In this case, second support wheel 50 is connected so it can be driven with the first support wheel 40 via an endless flexible transmission device 23 in the form of a drive chain or a drive belt which runs in a loop over the said first and second toothed wheel 43, 53, and is engaged with them. A spring-loaded tensioning device 24 is advantageously placed to act on said transmission device 23 to keep it in tension. In the depicted example, the tensioning device 24 is fixed on a rod 25 which is mounted so as to shift on holder unit 30, whereby a spring mechanism 26 is situated to act on said rod 25 to thereby keep the tensioning device 24 pressed down against transmission device 23.

With the depicted embodiment, both support wheels 40, 50 are placed so as to be rotated by the action of drive mechanism 22. As an alternative, support devices 20, 20' could lack a driving connection between the two support wheels 40, 50, consequently with the second support wheel 50 not being made to rotate by the action of drive mechanism 22. In this case the second support wheel 50 rotates by the action of friction forces between metal belt 21 and the outer peripheral surface 51 of the support wheel when the support device traverses work pieces 3, 4. As another alternative, support devices 20, 20' could be designed without a drive mechanism, consequently with neither support wheel 40, 50 being driven. In the latter case, the support wheels 40, 50 rotate by action of frictional forces between metal belt 21 and the outer peripheral surface 41, 51 of the support wheel, when the support device traverses work pieces 3, 4.

Figure 7:
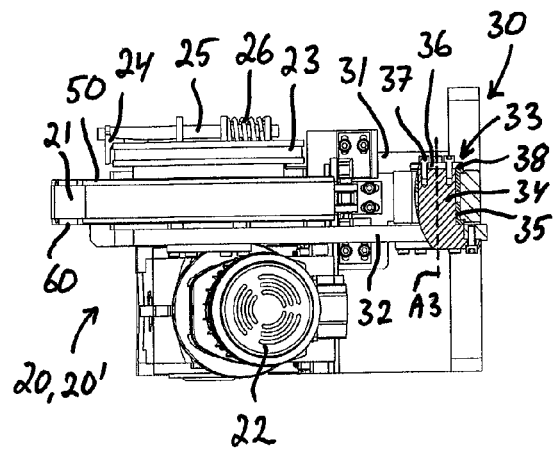
FIG. 7 a partially cut-away front view of the support device according to FIG. 2

With the depicted embodiment forms, the holder unit 30 comprises a base part 31 and a holder element 32 that is connected so as to pivot with base part 31, which is adjustable in various rotary positions relative to the base part 31 by rotation of the holder element 32 relative to the base part about a rotational axis A3 (see FIGS. 5 and 7) which is parallel with the rotational axes R1, R2 of the support wheel. The first support wheel 40 is supported so as to rotate at base part 31, while the second support wheel 50 is supported so as to rotate at rotating holder element 32. By governing the rotary position of holder element 32 relative to base part 31, it thus becomes possible to govern the mutual position between support wheels 40, 50. With the aid of a locking device 33, holder element 32 is able to be securely locked to base part 31 in the desired rotary position relative to it. In the depicted example, holder element 32 is connected in rotationally rigid fashion with an axle 34 (see FIG. 7) which is supported so as to rotate in a through-running hole 35 in base part 31. In this case locking device 33 exhibits a locking plate 36 which, aided by screws 37, is fixed to the one end of said axle 34. Locking plate 36 bears on a projection 38 which surrounds said hole 35. With the aid of screws 37, locking plate 36 can be brought toward the axle 34 and against the projection 38 for secure locking of holder element 32 at base part 31 in the desired rotary position.

The support body 60 and drive mechanism 22 are fixed to and held by base part 31 of the holder unit and consequently are not able to be rotated together with rotating holding element 32 of the holder unit. The support body 60 is rigidly connected with base part 31. Advantageously, support body 60 is adjustable in various positions relative to the base part 31 of the holder unit with the aid of suitable adjustment devices (not shown) to thereby allow regulation of the position of the support device relative to support wheels 40, 50.

Opposite support body 60 the metal belt 21 runs between a number of guiding rollers 39 (see FIGS. 3 and 4), which are supported so as to rotate at the base part 31 of the holder unit and whose assignment is to prevent metal belt 21 from being shifted sideways relative to support wheels 40, 50. These guiding rollers 39 thus keep metal belt 21 in the desired position relative to support wheels 40, 50 and prevent the metal belt from sliding off the support wheels.

The support device 20 which is used as a backing for welding tool 5 is mean to be kept bearing on work pieces 3, 4 with the support surface 61 of the support device, positioned opposite welding tool 5 to permit support body 60 to admit at least a part of the compression force that is exerted by welding tool 5 against work pieces 3, 4 and to allow the parts of metal belt 21 that bear on support surface 61 to keep the material plasticized during the welding operation in the area of the welded seam formed by the welding tool. Support surface 61 and the parts of metal belt 21 that extend over the support surface thus cover, on the inner side of work pieces 3, 4, an area around the part of seam 10 that is being processed currently by the rotating body 6 and pin 7 of the welding tool, as is illustrated in FIG. 5.

Like the body 6 and pin 7 of the welding tool, the metal belt 21 should be manufactured of material harder than work pieces 3, 4. For example, the metal belt 21 can be manufactured of steel.

The welding tool pin 7 should not come into contact with metal belt 21 during the welding operation. This can be arranged, for example, by using a pin 7 that is somewhat shorter than the depth of seam 10 between work pieces 3, 4 so that the outer end 11 of the pin during the welding operation comes to be located at a short distance from metal belt 21, as is depicted in FIG. 5.

Figure 8:
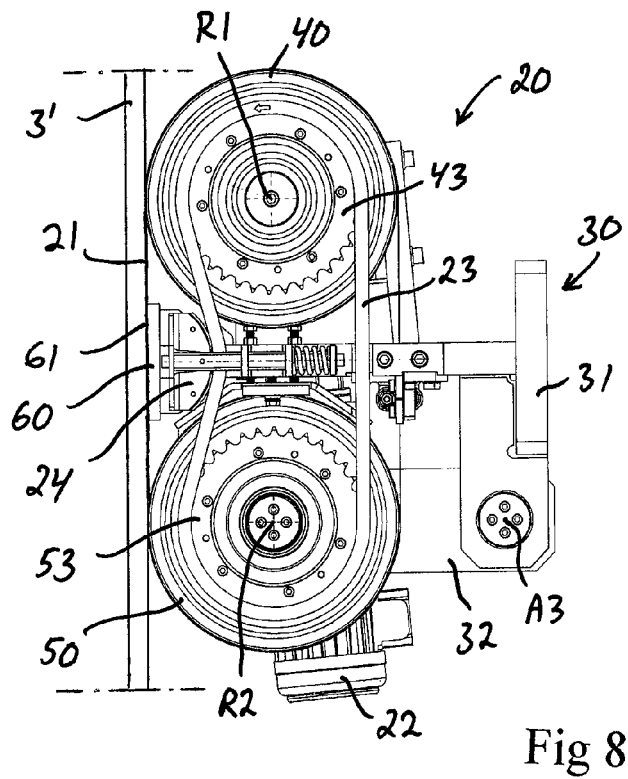
FIG. 8 a side view of a support device according to the invention with a support device shaped to bear on straight work pieces FIG. 9 a schematic side view of a backing arrangement for the welding station according to FIG. 1, with a carrier arm that is included in the backing arrangement and a support arm showed in a retracted position FIG. 10 a schematic horizontal view of parts included in a backing arrangement according to FIG. 9, with carrier arms and support arms shown in a retracted position FIG. 11 a schematic horizontal view corresponding to FIG. 10, but with the carrier arms and support arms shown in an extended position.

In the support device depicted in FIGS. 2-7, the support body 60 is shaped to adjoin curved work pieces. In this case, the support surface 61 of the support device is curved and situated to extend out beyond the outer peripheral surfaces 41, 51 of the support wheel. FIG. 8 depicts an alternative embodiment form where support body 60 is shaped to adjoin straight work pieces 3'. In the latter case, the support surface 61 of the support device is straight, and situated at a level with the outer peripheral surfaces 41, 51 of the support wheel.

The backing arrangement 2 exhibits a machine base 70 to carry backing device 20. With the embodiment form depicted in FIGS. 1, 9, 10 and 11, the first support device 20 is carried by a carrier arm 71 included in machine base 70. By means of the base part 31 of the holder element, support device 20 is fixed to the outer end of this carrier arm 71. Additionally, machine base 70 exhibits a base part 72 (see FIG. 9) and an elongated carrier element 73 which is supported by base part 72 and connected in shiftable fashion with it. Carrier element 73 can be shifted in its longitudinal direction relative to base part 72. Carrier arm 71 is supported by carrier element 73 and is fixed so as to pivot at the front end of the carrier element. The carrier arm 71 can pivot relative to carrier element 73 between a retracted position (see FIGS. 9 and 10), in which the carrier arm 71 extends essentially in the longitudinal direction of the carrier element, and a deployed operating position (see FIGS. 1 and 11), in which carrier arm 71 extends essentially perpendicular to the longitudinal direction of the carrier element.

In the embodiment form depicted in FIGS. 1, 9, 10 and 11, the machine base 70 also exhibits a support arm 74, which holds the second support device 20'. Support device 20' is fixed via the base part 31 of the holder element at the outer end of this support arm 74. The support arm 74 is carried by carrier element 73 and is fixed so as to pivot at the front end of the carrier element opposite carrier arm 71. Support element 74 can be pivoted relative to carrier element 73 between a retracted position (see FIGS. 9 and 10), in which support arm 74 extends essentially in the longitudinal direction of the carrier element, and a deployed support position (see FIGS. 1 and 11), in which support arm 74 essentially extends perpendicular to the longitudinal direction of the carrier element. The second support device 20' and support arm 74 are intended to contribute to the support of carrier arm 71 and carrier element 73, in order by that means to prevent it from shifting under the action of the compression force which is exerted during the welding operation by the welding tool body 6 against first support device 20. If necessary, one or more additional support arms 74 with appurtenant support devices 20' can be carried by, and fixed so as to rotate, on carrier element 73. If carrier element 73 is sufficiently rigid, support arm 74 and the appurtenant support device 20' do not need to be used. In addition, naturally it is possible to use a support arm 74 that carries another type of support device than that described here.

Machine base 70 is equipped with maneuvering devices 75a, 75b of a suitable type for pivoting of carrier arm 71 and support arm 74 relative to carrier element 73. In the depicted example, the machine base is equipped with a first maneuvering device 75a in the form of a hydraulic cylinder for pivoting of carrier arm 71 relative to carrier element 73 about a first rotary axle A1, and a second maneuvering device 75b in the form of a hydraulic cylinder for pivoting of support arm 74 relative to carrier element 73 about a second rotary axle A2. The first maneuvering device 75a has a cylindrical part 76a which is joint-connected with carrier element 73 and a piston rod 77a which is joint-connected with carrier arm 71, while the second maneuvering device 75b has a cylindrical part 76b which is joint-connected with carrier element 73 and a piston rod 77b which is joint-connected with support arm 74.

The first support device 20 is conveniently able to be shifted in the longitudinal direction of the carrier arm, to allow the distance from support body 60 and support wheels 40, 50 to carrier element 73 to be adjusted. In the depicted example, this is made possible by an outer part 71a of carrier arm 71 that is able to be telescopically shifted in the longitudinal direction of the carrier arm relative to an interior part 71b of the carrier arm. The outer part 71a can be shifted relative to the inner part 71b with the aid of a hydraulic cylinder (not shown) or some other suitable maneuvering device.

In a corresponding manner, the second support device 20' can suitably be shifted in the longitudinal direction of the support arm to allow regulation of the distance from support body 60 and support wheels 40, 50 to carrier element 73. In the depicted example this is made possible by an outer part 74a of support arm 74 which is able to be telescopically shifted in the longitudinal direction of the support arm relative to an inner part 74b of the support arm. The outer part 74a can be shifted relative to the inner part 74b with the aid of a hydraulic cylinder (not shown) or some other suitable maneuvering device.

The welding tool 5 and the first support device 20 are made to traverse seam 10 between the work pieces 3, 4 which are to be joined, either by having the welding tool 5 and support device 20 move synchronous with each other along stationary work pieces, or by having the work pieces 3, 4 move while welding tool 5 and support device 20 remains in a stationary position. With the welding station 1 depicted in FIGS. 1, 9, 10 and 11, the welding tool 5 and support devices 20, 20' are meant to be kept in a stationary position during the welding operation while work pieces 3, 4 are rotated with the aid of suitable driving tools which are (not shown). Naturally the work pieces 3, 4 are to be kept in a fixed position relative to each other during this rotation.

Figure 9:
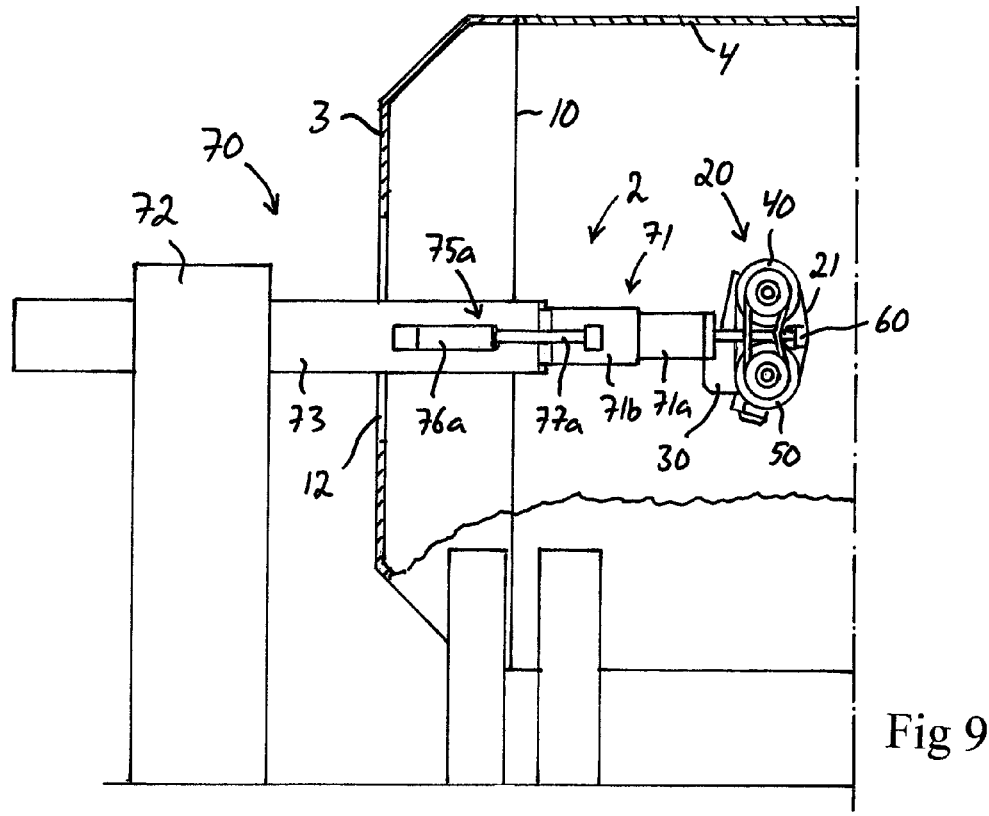
Figure 10:
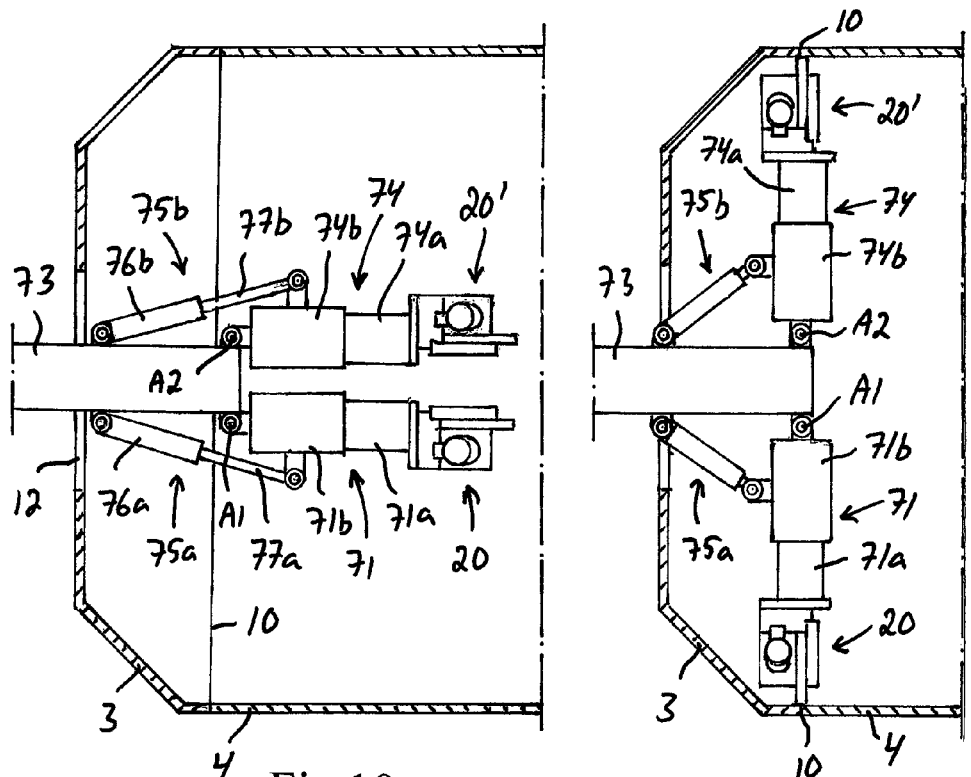
Figure 11:
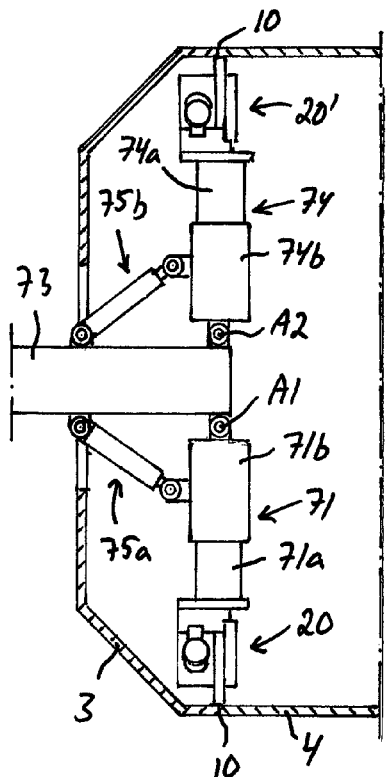

In the depicted example, welding station 1 is used to join a first work piece 3, which is intended to form an end section of a container, with a second work piece 4, which is intended to form a cylindrical part of a container. With the carrier arm 71 and support arm 74 in the retracted position, the front part of carrier element 73, along with carrier arm 71, the first support device 20, support arm 74 and the second support device 20' can be inserted into a space within working pieces 3, 4 via an access opening 12 in the first work piece 3, as is depicted in FIGS. 9 and 10. After insertion into the said space, carrier arm 71 and support arm 74 pivot out to the deployed position, after which the outer part 71a of the carrier arm and the outer part 74a of the support arm are shifted so that metal belt 21 of support devices 20, 20' comes to bear on the inner walls of work pieces 3, 4, directly over the seam 10. The welding tool body 6 then presses against the outer walls of work pieces 3, 4 directly over seam 10 between them, and opposite support surface 61 of the support body 60 of the first support device, while the welding tool pin 7 is admitted in seam 10. The work pieces 3, 4 then rotate at low speed relative to welding tool 5 and support devices 20, 20', so that welding tool 5 and support devices 20, 20' come to traverse seam 10 while the welding tool body 6 and pin 7 rotate at high speed, to create a welded seam between work pieces 3, 4 under the action of frictional heat generated at the contact surfaces between work pieces 3, 4 and the welding tool body 6. The material plasticized by frictional heat is kept, under the action of the welding tool body 6 and the metal band 21 of the first support device, in the area of the seam 10, where it then solidifies to form a welded seam between work pieces 3, 4. During the welding operation, work pieces 3, 4 are kept in fixed tension relative to each other with the aid of fixed tensioning tools (not shown) in such a way that the seam 10, i.e., the air gap, between the end edges of the work pieces that face each other, does not exceed the size at which a substandard weld is formed.

Naturally, the invention is not limited in any manner to the embodiment forms described above, but rather a plurality of possibilities for modifications thereof should be obvious for one skilled in the art in this field, without it deviating for that reason from the basic idea of the invention as it is defined in the appended patent claims.

The invention claimed is:

1. A support device for bearing on one or more work pieces in connection with friction stir welding, the support device comprising:
   a holder unit,
   a first support wheel carried by the holder unit, the first support wheel having an outer peripheral surface, the first wheel being rotatable relative to the holder unit about a first rotational axis;
   a second support wheel carried by the holder unit, the second support wheel having an outer peripheral surface, the second support wheel being rotatable relative to the holder unit about a second rotational axis parallel to the said first rotational axis;
   a support body connected to the holder unit, the support body positioned between the first and second support wheels, the support body having a support surface turned outward; and
   a flexible belt which runs in a loop over the outer peripheral surfaces of the first and second support wheels, the flexible belt being is in sliding contact with the support surface of the support device;
   wherein the support device provides support as it bears on one or more work pieces with the outer peripheral surfaces of the first and second support wheels, and with the support surface of the support body resting against the work pieces via the flexible belt;
   wherein the holder unit comprises a base part and a holder element that is pivotable with respect to the base part;
   wherein the holder unit is adjustable relative to the base part by rotation of the holder element relative to the base part about a rotational axis which is parallel with the said first and second rotational axes;
   wherein one of the support wheels is supported so as to rotate at the holder element; and
   wherein the support device includes a locking device for locking of the holder element on the base part in a desired rotary position relative to the base part.

2. The support device of claim 1, wherein the support device comprises a drive mechanism for rotating the first support wheel.

3. The support device of claim 2, wherein the drive mechanism is coupled to the holder unit.

4. The support device of claim 3, wherein the drive mechanism comprises an electric or hydraulic motor.

5. The support device of claim 4,
wherein a first toothed wheel is connected in rotationally rigid fashion with the first support wheel,
wherein a second toothed wheel is connected in rotationally rigid fashion with the second support wheel, and
wherein the second support wheel is drivable using the first support wheel via an endless flexible transmission device in the form of a drive chain or drive belt which runs in a loop over the said first and second toothed wheel.

6. The support device of claim 5, wherein the support device comprises a spring-loaded tensioning device engageable with the transmission device to keep the transmission device in tension.

7. The support device of claim 1, wherein the support body is secured at the base part of the holder unit.

8. The support device of claim 7, wherein the support body is adjustable relative to the base part of the holder unit to allow regulation of the support body position relative to the support wheels.

9. The support device of claim 8, wherein the support body is detachably connected with the holder unit.

10. The support device of claim 9, wherein the flexible belt comprises steel.

11. The support device of claim 10, wherein the support wheels include a friction-enhancing coating on their outer peripheral surface wherein the flexible is situated so as to bear on this coating.

12. The support device of claim 11, wherein the friction-enhancing coating comprises rubber.

13. A backing arrangement for supporting a welded seam formed between two work pieces by friction stir welding with a welding tool, wherein the backing arrangement includes a support device according to claim 11, wherein the support device is configured to bear on the work pieces with the support surface and with the support body included in the support device positioned opposite the said work tool to permit the support body to apply at least a part of the compression force exerted by the welding tool against the work pieces and to allow the flexible belt bearing on the support surface of the support body to keep the material plasticized during the welding operation in the area of the welded seam.

14. The backing arrangement of claim 13, wherein the backing arrangement comprises a machine base for carrying the support device,
wherein the support device is secured at the outer end at a carrier arm included in the machine base, and
wherein the machine base comprises an elongated carrier element, the carrier arm being supported by the carrier element and being pivotable relative to the carrier element between a retracted position and a deployed working position.

* * * * *